United States Patent [19]

Yamaura et al.

[11] Patent Number: 4,658,498

[45] Date of Patent: Apr. 21, 1987

[54] PROCESS FOR PRODUCING RECHARGEABLE ELECTROCHEMICAL DEVICE

[75] Inventors: Junichi Yamaura, Osaka; Yoshinori Toyoguchi, Yao; Tooru Matsui, Moriguchi; Takashi Iijima, Hirakata, all of Japan

[73] Assignee: Matsushita Electric Industrial Co., Ltd., Osaka, Japan

[21] Appl. No.: 681,848

[22] PCT Filed: Apr. 5, 1984

[86] PCT No.: PCT/JP84/00171

§ 371 Date: Dec. 4, 1984

§ 102(e) Date: Dec. 4, 1984

[87] PCT Pub. No.: WO84/04001

PCT Pub. Date: Oct. 11, 1984

[30] Foreign Application Priority Data

Apr. 7, 1983 [JP] Japan ................................. 58-61624

[51] Int. Cl.⁴ ......................... H01M 6/00; H01M 6/14
[52] U.S. Cl. .................................. 29/623.1; 429/194; 429/222; 429/229
[58] Field of Search ....................... 429/194, 229, 222; 29/623.1

[56] References Cited

U.S. PATENT DOCUMENTS 4,383,358  5/1983  Peled et al. ...................... 29/623.1
4,450,213  5/1984  Dey et al. ...................... 29/623.1 X

FOREIGN PATENT DOCUMENTS 56-91370  7/1981  Japan .
56-86463  7/1981  Japan .

Primary Examiner—Brian E. Hearn
Assistant Examiner—Stephen J. Kalafut
Attorney, Agent, or Firm—Stevens, Davis, Miller & Mosher

[57] ABSTRACT

An alloy capable of reversibly absorbing and desorbing lithium ions in a non-aqueous electrolyte containing lithium ions on charging and discharging has excellent applicability to anode for rechargeable electrochemical devices. However, such alloy, when absorbed with lithium, loses its flexibility, so that when it is incorporated in a device in a charged state, it is subject to trouble such as cracking and can not display its properties. This invention adopts a method in which anode alloy is combined with lithium by connecting them so as to be electronically conductive to each other and this combination is fitted into the device, and then the electrolyte is supplied into the device to have lithium absorbed in anode alloy in the device. According to this method, cracking of cathode can be prevented.

24 Claims, 5 Drawing Figures

PROCESS FOR PRODUCING RECHARGEABLE ELECTROCHEMICAL DEVICE

TECHNICAL FIELD

This invention relates to a process for producing rechargeable electrochemical devices, especially secondary batteries using lithium as anode active material and a non-aqueous electrolyte.

BACKGROUND ART

Non-aqueous electrolyte primary batteries using lithium as anode active material and carbon fluoride, manganese dioxide or the like as cathode active material have already been put to practical use and are increasingly used as power sources for various types of electronic equipments. Such non-aqueous electrolyte type batteries using lithium for anode are specified by high voltage and high energy density, and in view of such specific advantages, intense studies have been and are made for the development of secondary batteries using non-aqueous electrolyte. Nevertheless, no successful attainment has yet been made for the practical application of such secondary batteries, mostly due to the failure in overcoming the problems of short charge and discharge life and low charging and discharging efficiency, for which anode is greatly responsible.

In the case of lithium anode made by press bonding a metallic lithium plate to a screen-like current collector metal such as nickel, which is used in primary batteries, it is difficult to let lithium, which has been dissolved into the electrolyte on discharging, separate out to restore its original plate-like form on charging. For instance, lithium is precipitated irregularly in the form of dendrite on charging and such precipitated lithium drifts away from the electrode plate and no longer serves as active material, or the lithium which was precipitated in the form of dendrite may pass through the separator and come into contact with the cathode to cause short-circuiting.

Various attempts have been made for overcoming such problems of lithium anode. It is considered as the most prospective method to use as anode material a certain type of metals or alloys which have the specific property to absorb or take up lithium ions in the electrolyte on charging and desorb absorbed lithium as ions into the electrolyte on discharging.

As such type of anode materials, there are known aluminum (U.S. Pat. No. 3,607,413), silver (Japanese Patent Application Laid-Open No. 7386/81, U.S. Pat. No. 4,316,777, and U.S. Pat. No. 4,330,601), lead (Japanese Patent Application Laid-Open No. 141869/82), tin, tin-lead alloy, etc. These materials, however, have the defect that the increase of lithium absorption rate with charging causes fine powdering of the anode material to make it unable to maintain the shape of electrode.

On the other hand, it has found that the alloys proposed by the present inventors in PCT/JP 84/00086 and PCT/JP 84/00088, that is, the alloys comprising cadminum and/or zinc as essential ingredients and further containing at least one member selected from the group consisting of lead, tin, indium and bismuth are relatively high in the rate of absorption of lithium and also excellent in charge/discharge reversibility and thus have a bright prospect for practical use as a rechargeable anode material.

It was found, however, that the following problems arise when a battery is actually assembled by using said alloys as anode material. When assembling a battery, the anode is usually used in a charged state, that is, in a lithium-absorbed state, but when lithium is absorbed in said alloys, they become hard and brittle and lose flexibility. Therefore, especially when cathode and anode are laminated with a separator therebetween and wound up spirally to constitute a spiral electrode plate, the anode tends to be cracked to make it unable to obtain a desired electrode capacity. Even in flat type cells using a flat plate-like anode, the anode can be cracked due to a shock of pressure at the time of sealing.

Assemblage of a battery by leaving the anode in a non-charged state, that is, in a non-lithium-absorbed state, is also difficult for the following reasons.

Intercalation compounds such as $TiS_2$ and $V_6O_{13}$ are known as cathode material for non-aqueous electrolyte secondary batteries. In case of using $TiS_2$ for instance, there takes place at the cathode a reaction of the following formula:

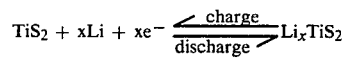

Since the discharging product $Li_xTiS_2$ or $Li_xV_6O_{13}$ is extremely unstable to water or oxygen, usually such compound as $Li_xTiS_2$ or $Li_xV_6O_{13}$ is not used but a compound such as $TiS_2$ or $V_6O_{13}$ is used as cathode material when assembling a battery. Further, it is difficult to chemically synthesize $Li_xTiS_2$ or $Li_xV_6O_{13}$. Since such compound is produced only when $TiS_2$ or $V_6O_{13}$ is electrochemically reduced according to the above-shown formula, a step for electrochemical reduction of $TiS_2$ or $V_6O_{13}$ is required for forming a cathode by using $Li_xV_6O_{13}$ or $Li_xTiS_2$. This makes the battery production process complicated and time-consuming. For these reasons, an oxide type compound such as $TiS_2$ or $V_6O_{13}$ is used instead of $Li_xTiS_2$ or $Li_xV_6O_{13}$ for forming cathode when assembling a battery.

Thus, it is necessary to use a lithium-absorbed anode for producing a desired battery. However, as mentioned below, such lithium-absorbed anode is devoid of flexibility and tends to be cracked in the course of production of the battery, causing a reduction of performance of the produced battery.

DISCLOSURE OF INVENTION

An object of this invention is to provide a process for producing an electrochemical device such as secondary battery using a non-aqueous electrolyte, characterized by using as anode material an alloy which is capable of absorbing lithium ions in the electrolyte upon charging to form an alloy with lithium and desorbing absorbed lithium as ions into the electrolyte upon discharging, and further characterized in that said anode material is incorporated in the battery in a non-charge state, that is, in a state where said anode material is not yet absorbed with lithium and maintains flexibility, and lithium is absorbed in the anode after the battery is assembled.

Another object of this invention is to provide a process for constructing an electrochemical device, especially one comprising a bunch of electrode plates each being made by spirally winding cathode and anode with a separator therebetween, without giving rise to any trouble such as cracking of anode throughout the process.

Said objects of this invention can be achieved by using as anode material an alloy which would not be finely powdered even if lithium is absorbed therein to a point where the alloy comes to have an equal potential to lithium metal in a non-aqueous electrolyte, connecting such alloy anode to lithium metal so that they are electronically conductive to each other, incorporating said anode together with cathode and separator into an electrochemical device and then feeding a non-aqueous electrolyte into the device to have lithium absorbed in said anode alloy in the device.

According to this method, even when anode alloy is contacted with metallic lithium, the alloy still maintains flexibility since lithium is not yet absorbed therein before feed of the electrolyte, so that the electrodes can be assembled into the device in a desired configuration, especially in a spiral state.

Japanese Patent Application Laid-Open No. 75434/78 and U.S. Pat. No. 4,056,885 disclose a method for producing a lithium-aluminum alloy electrode in which an aluminum and lithium laminate is immersed in an electrolyte.

The process of this invention is based on the same principle as said prior art in that lithium is absorbed in a anode alloy with which said lithium is electrically contacted in the electrolyte to thereby alloy lithium with said anode alloy. However, the anode alloy used in the present invention is different in properties from aluminum and further, said prior art method has no implication to the idea of this invention in which an anode alloy, which loses its flexibility on absorption of lithium, is absorbed with lithium after said alloy is worked into a spiral structure.

As said before, when anode metal and lithium are contacted in the electrolyte, a reaction occurs in a limited area where said anode, electrolyte and lithium are in contact with each other. In case of using aluminum as anode metal, finely powdered LiAl is produced at the contact area of said three elements, so that the anode metal collapses and becomes unable to perform its normal function as an electrode.

In the present invention, a specific alloy is used as anode, which alloy would not be finely powdered even when lithium is absorbed therein in the electrolyte to such a point where said lithium has an equal potential to the anode metal.

The anode alloy which would not be finely powdered even if absorbed with lithium till showing an equal potential to lithium metal can be confirmed as such by, for instance, the following experiment.

The electrode made of an alloy to be tested and a lithium electrode containing a greater amount of lithium than to be absorbed in said alloy are immersed in a non-aqueous electrolyte, for example, propylene carbonate having dissolved therein 1 mol/l of lithium perchlorate, and then the terminals of said both electrodes are connected through a load, for example, a resistance of 1 K$\Omega$. If this situation is left as it is, lithium is dissolved into the electrolyte from the lithium electrode and a reaction occurs in which lithium ions in the electrolyte are steadily absorbed in the alloy, causing a flow of electric current to the load. This condition is left as such until a stage is reached where no electric current flows to the load, that is, the potential of alloy electrode becomes equal to that of lithium electrode, and the charge of said alloy electrode is observed.

From the results of the experiments such as said above, it was confirmed that an alloy composed of at least one member selected from the group consisting of Sn, Pb, In and Bi and at least one member selected from the group consisting of Cd and Zn is best suited as the alloy to be used as anode material in this invention.

When Al used in the conventional method and Sn, Pb, In and Bi in the above-said alloy components were used as anode material in said experiment, the anode was finely powdered in accordance as lithium was absorbed. Cd and Zn, on the other hand, were not finely powdered, but the amount of electric current flowing to the load was small. A detailed description of said alloys is given in PCT/JP 84/00086 and PCT/JP 84/00088. It appears that Sn, Pb, In and Bi take a part in the absorption of lithium and Cd and Zn play the role of a binder which helps to prevent fine powdering of the anode.

These facts suggest the use of an alloy with a high content of at least one of Sn, Pb, In and Bi for forming an anode with a large amount of electricity of charge and discharge. However, for eliminating the risk of fin powdering of the anode when lithium has been absorbed to the point where the alloy has equal potential to lithium, Cd and/or Zn should be contained in an amount of at least 5% by weight, and for further preventing such fine powdering due to repetition of charge and discharge, they need to be contained in an amount of at least 10% by weight.

A more detailed explanation of the alloys suited for use in this invention will be given below.

In the case of an alloy composed of Cd and at least one of Sn, Pb, In and Bi, the Cd content needs to be at least 10% by weight as said above, but for increasing the amount of electricity of charge and discharge of the anode, it is desirable that the Cd content is not greater than 80% by weight, preferably in the range of 10 to 40% by weight.

Even in the case of an alloy composed of Cd and at least two of Sn, Pb, In and Bi, the Cd content should be in the range of 10 to 80% by weight, preferably 10 to 40% by weight. Three-component alloy containing Cd has more excellent charging and discharging characteristic than two-component alloy containing Cd. This is considered due to diffusion of lithium along the phase-to-phase interface in the alloy.

The charge and discharge rate further increases when at least one of Hg, Ag, Sb and Ca is added in an amount not exceeding 20% by weight to the alloy composed of Cd and at least one of Sn, Pb, In and Bi.

Among the above-said alloys, the one composed of Cd and at least one of Sn and Pb is low in cost and also high in charge and discharge rate. Sn-Cd alloy and Pb-Cd alloy show a large amount of electricity of charge and discharge when the Cd content is in the range of 10 to 80% by weight, preferably 10 to 40% by weight.

Comparing Sn-Cd alloy and Pb-Cd alloy, the former is more excellent in high-rate charging and discharging characteristic. Comparing Sn and Pb, the latter is more inexpensive. Accordingly, it is possible to make an anode which is low in cost and excellent in high-rate charging and discharging characteristic by using a Pb-Sn-Cd alloy. Such three-component alloy is preferably of a composition consisting of 10 to 80% by weight, preferably 10 to 40% by weight of Cd, 20 to 30% by weight of Sn and the balance of Pb.

The most simple method of making an alloy anode is to immerse a meshed current collector metal such as copper, nickel, iron, stainless steel, etc., in a molten alloy to coat the collector metal with the alloy. Preferably, In is contained in the alloy for bettering its adhesion to the collector metal. In also has an ability to absorb and desorb lithium according to charge and discharge, so that the use of this metal can better alloy adhesion to collector metal while improving the charge and discharge rate of the anode. This metal, however, is expensive so that it should be used in a smallest effective amount. In the case of an Sn-In-Cd alloy, a preferred example of composition comprises 10–80% by weight, preferably 10–40% by weight of Cd, 3–10% by weight of In and the balance of Sn. In the case of Pb-In-Cd alloy, too, it is desirable that the amounts of Cd and In are substantially the same as in the case of Sn-In-Cd alloy. Also, in the case of Sn-Pb-In-Cd alloy, the formed anode proves most advantageous in terms of performance and cost when the content of Cd is in the range of 10 to 80, preferably 10 to 40% by weight, In in the range of 3 to 10% by weight and Pb in the range of 20 to 80, preferably 40 to 80% by weight.

In case of forming the anode from an alloy of Zn and at least one of Sn, Pb, In and Bi, the content of Zn needs to be at least 10% by weight for inhibiting fine powdering of the alloy even when lithium is absorbed in the alloy till the alloy comes to have an equal potential to lithium. For further preventing fine powdering by the repetition of charge and discharge which cause corresponding absorption and desorption of lithium, the Zn content should be at least 15% by weight. However, since the charge and discharge rate of the cathode loweres with the increase of Zn content, the amount of Zn in the alloy should not exceed 80% by weight.

In the case of a Bi-Zn two-component alloy, the Zn content needs to be at least 10% by weight for preventing fine powdering of the alloy even when lithium is absorbed, but for obtaining the sufficient charge and discharge characteristic, a Zn content of 50 to 85% by weight is required.

With Sn-Zn alloy, good anode characteristic can be obtained when the Zn content is 15 to 80% by weight, especially 30 to 60% by weight.

In the case of an alloy composed of Zn and at least two of Sn, Pb, In and Bi, the Zn content should be 20 to 80% by weight for obtaining a large amount of electricity of charge and discharge. In the case of Sn-In-Zn alloy, the Sn/In ratio by weight is preferably from 1/9 to 9/1. In the case of Sn-Pb-Zn alloy, the preferred Sn/Pb weight ratio is from 4/1 to 1/2. With Pb-In-Zn alloy, good result is obtained when the Pb/In ratio by weight is in the range of 3/1 to 1/9. In the case of an alloy composed of Bi, Zn and at least one of Sn, Pb and In, the Zn content is preferably 20 to 80% by weight while the Bi content is desirably not greater than 50% by weight.

Among the alloys containing Zn, those containing a greater amount of Sn than Pb are advantageous for achieving high-rate charge and discharge. In the case of Sn-Pb-Zn alloy, the Zn content should be 20 to 80% by weight, preferably 30 to 60% by weight, and the Pb content is preferably 10 to 20% by weight, the remainder being Sn.

In the production of anode, the most simple method is to coat a metallic current collector with an alloy by immersing the collector in the molten alloy. In this case, it is desirable to use an In-containing alloy as in the case of said Cd-based alloy for bettering alloy adhesion to the collector metal In the case of Sn-In-Zn alloy, the Zn content is preferably 20 to 80% by weight, most preferably 30 to 60% by weight, and the In content is preferably 3 to 10% by weight, the remainder being Sn. In the case of Sn-Pb-In-Zn alloy, it is preferably composed of 20 to 80%, preferably 30 to 60% by weight of Zn, 10 to 20% by weight of Pb, 3 to 10% by weight of In and the balance of Sn.

In the above examples, the alloys containing at least one of Cd and Zn were described, but the alloys containing both of them can be similarly used. In this case, for obtaining an alloy which would not be finely powdered even after absorption of lithium to the point of equal potential and also even after the repetition of charge and discharge cycle, the sum of the Zn and Cd contents should be in the range of 15 to 80% by weight, and in view of charge and discharge rate, the content of Cd is preferably not greater than 50% by weight. In Sn-Zn-Cd three-component alloy, the sum of the Cd and Zn contents should be 20 to 80% by weight, preferably 30 to 60% by weight, and the content of Cd is preferably 10 to 20% by weight. In the case of Pb-Sn-Cd-Zn four-component alloy, a composition comprising 20 to 80%, preferably 30 to 60% by weight of the sum of Zn and Cd contents and the Cd content being preferably 10 to 20% by weight, 10 to 20% by weight of Pb and the balance of Sn is preferred for obtaining good charge and discharge characteristic of the anode. In the case of Sn-In-Zn-Cd alloy, too, good anode characteristic is obtained and also the cost is relatively low when the amounts of the four components are so selected that the sum of the Zn and Cd contents is 20 to 80%, preferably 30 to 60% by weight, the Cd content 10 to 20% by weight and the In content 3 to 10% by weight. Also, in the case of Pb-Sn-In-Zn-Cd five-component alloy, good anode characteristic is obtained and also the cost is relatively low when the alloy is of a composition where the sum of Zn and Cd is 20 to 80%, preferably 30 to 60% by weight, Cd 10 to 20% by weight, Pb 10 to 20% by weight and In 3 to 10% by weight.

In the above-said alloys, the amount of lithium that can be absorbed to the extent that the alloy has an equal potential to lithium metal is up to about 20% by weight of the alloy though such amount varies depending on the alloy composition.

Various methods, such as mentioned below, are available for producing an anode with an alloy:

(1) A metallic current collector body is immersed in a molten alloy and then picked up, thereby coating said collector with the alloy.

(2) A molten alloy is cooled and then rolled to a desired thickness.

(3) A rolled alloy plate is press bonded to a metallic current collector, or a part of the alloy plate is melted and the collector is embedded therein.

(4) The alloy composing metals are coated on the surface of a metallic current collector plate by sputtering to form an alloy layer on said collector plate.

(5) An alloy powder is mixed with a binding agent such as polytetrafluoroethylene or polyethylene and compression molded to form an anode.

(6) In the course of compression molding in the method (5), a metallic current collector body is embedded in the anode.

Plate-like alloy anodes can be obtained from the methods (1)–(4). Various metals such as nickel, copper, iron, stainless steel, etc., can be used as metallic current collector, and in the methods (1)–(4) and (6), such metal is usually used in the form of a meshed plate.

For constituting a rechargeable electrochemical device, especially a secondary battery, the following methods can be used: both anode and cathode are wound together spirally with a separator disposed therebetween and put into a battery case; a plate-like laminate of anode, separator and cathode is incorporated into a flat battery case; cathode is compression molded on the inner wall face of the case and anode is incorporated into the central portion thereof.

In case of spirally winding anode alone or with cathode, those of the above-said alloys in which the sum of contents of Sn, Pb, In and Zn is 40% by weight or above are especially preferred because they have good flexibility and allow easy winding.

The lithium which is incorporated along with anode alloy into the electrochemical device and absorbed in the alloy is usually used in the form of a plate, and such lithium plate needs to be connected to anode alloy so that they are electronically conductive to each other. Such connecting method is explained below.

(a) Anode and lithium plate are press bonded. This is the most simple method. Said anode plate and lithium plate are simply placed one on the other and pressed, whereby electronic conduction between them can be easily obtained. A meshed metallic current collector may be sandwiched between anode and lithium, and the three may be press bonded into an integral structure.

(b) The exposed portion of a current collector metal which has been press bonded to anode alloy or partially embedded therein is spot welded to a collector metal press bonded to lithium plate. Also, as shown in an Example given later, anode alloy may be joined as by press bonding to, for example, right half portion of a meshed collector metal designed to be bent centrally thereof while similarly joining lithium plate to the left half portion of said collector metal, and a lead may be joined to the exposed portion of said collector metal.

(c) Porous anode alloy is used and lithium is filled in the pores of said alloy. For instance, a spongy alloy is prepared and lithium is filled into the fine pores thereof. Also, alloy powder and lithium powder may be mixed together with a binding agent such as polytetrafluoroethylene or polyethylene and compression molded. In this case, collector metal may be embedded into the molding.

Among the above-said methods, the method (b) is best in case the electrode is wound spirally. When anode and lithium are simply press bonded as in the method (a), they might separate from each other due to different curvature at the time of winding. In case of using powdery lithium as in the method (c), care must be taken in treating it because of high reactivity of lithium.

The maximum amount of lithium that can be incorporated into the electrochemical device along with anode alloy in the manner described above is usually defined by the lithium-absorbing capacity of said alloy, and since a long time is required for absorbing lithium in the alloy to the saturation point, that is, to the point where the alloy has an equal potential to lithium, the amount of absorbed lithium is usually below the saturation point. In some cases, however, lithium is absorbed in greater than saturation amount depending on the properties of anode. For instance, in case of using $TiO_2$ as cathode active material, this substance absorbes 1.5 mole of lithium per mole of $TiO_2$ at the time of initial discharge, but at the next charge and discharge, it desorbes and absorbes only 1 mole of lithium. In case of using such cathode, it needs to use an extra amount of lithium which corresponds to the amount of lithium that is left absorbed in the cathode.

A specific type of cathode that has charge and discharge reversibility is used for constituting the rechargeable electrochemical device according to this invention. For instance, an cathode composed of such active material as $MoO_3$, $TiS_2$, $V_6O_{12}$, $Cr_3O_8$, $TiO_2$, $WO_3$, $TaS_2$ or $NaCrS_2$ can be used.

If known types of carbonaceous electrode such as graphite electrode or active carbon electrode such as employed in electric double layer capacitors are used, the resulting battery may be used as a power source for specific purposes such as memory backup.

Organic electrolyte can be suitably used as non-aqueous electrolyte in this invention. As the organic solvent thereof, there can be used, for example, propylene carbonate, γ-butyrolactone, ethylene carbonate, 1,2-dimethoxyethane, tetrahydrofuran, 2-methyltetrahydrofuran, 1,3-dioxolan and the like. As lithium salt used as solute, one may use various known compounds generally employed in organic electrolyte batteries, such as $LiClO_4$, $LiBF_4$, $LiAsF_6$, $LiSO_3CF_3$, $LiPF_6$ and the like. These organic solvents and solute materials can be used not only singly but also in admixture.

BEST MODE FOR CARRYING OUT THE INVENTION

Figure 1:
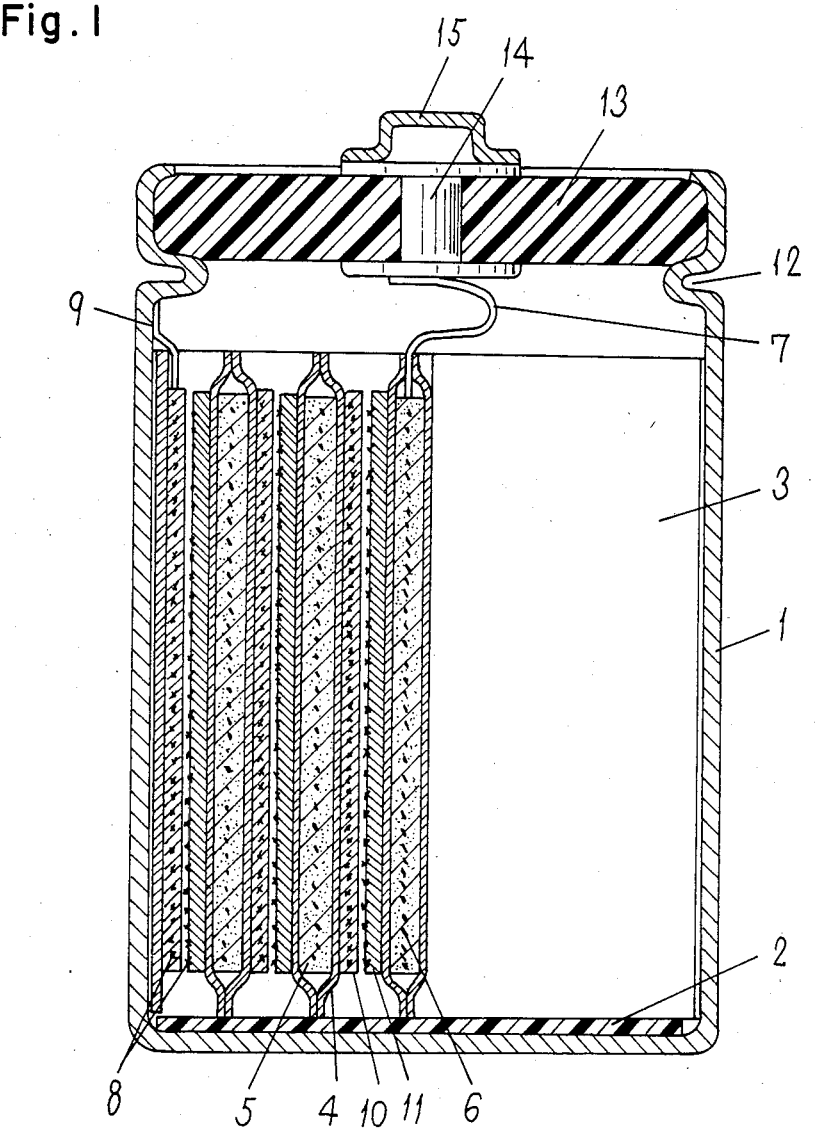
FIG. 1 is a partially cut-out side sectional view showing the parts of a secondary battery in an embodiment of this invention.

FIG. 1 shows a cylindrical secondary battery embodying the present invention. Numeral 1 in the drawing designates a battery case made of nickel-plated iron and designed to double as a anode terminal. A synthetic resin-made insulating plate 2 is placed at the bottom of said case 1. A bunch of spiral electrode plates 3 are incorporated in said case 1, each of said electrode plates consisting of a cathode 5 wrapped with a separator 4 and an anode side assemblage both of which were wound together spirally. Each cathode 5 is composed of an expanded metal 6 of titanium serving as a current collector and a titanium-made lead 7 welded to an end of said expanded metal.

Figure 2:
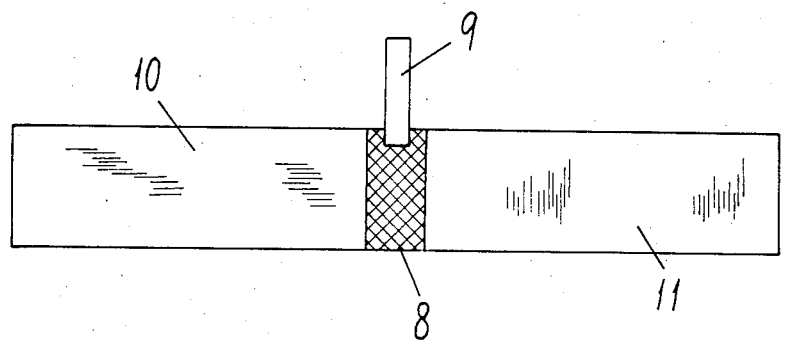
FIG. 2 is a front view thereof, showing the construction on the anode side.

Said anode assembly, as illustrated in FIG. 2, consists of an expanded metal of nickel 8 serving as current collector, a nickel-made lead 9 welded to a central part of said expanded metal 8, an anode alloy 10 coating the right half of said expanded metal and a lithium metal plate 11 press bonded to the left half of said expanded metal. The central exposed portion of said expanded metal is bent and the assembly is wound spirally with said cathode to a unitary electrode plate.

A groove 12 is provided at an upper part of case 1 and a determined amount of electrolyte is poured into the case. The case is sealed by a synthetic resin-made sealing plate 13. An aluminum-made rivet terminal 14 is secured at the center of said sealing plate 13. An cathode terminal cap 15 is welded to the top of said terminal 14 while a cathode lead 7 is welded to the bottom of said terminal 14. Lead 9 of said anode assembly is also welded to the inner wall of case 1.

Figure 4:
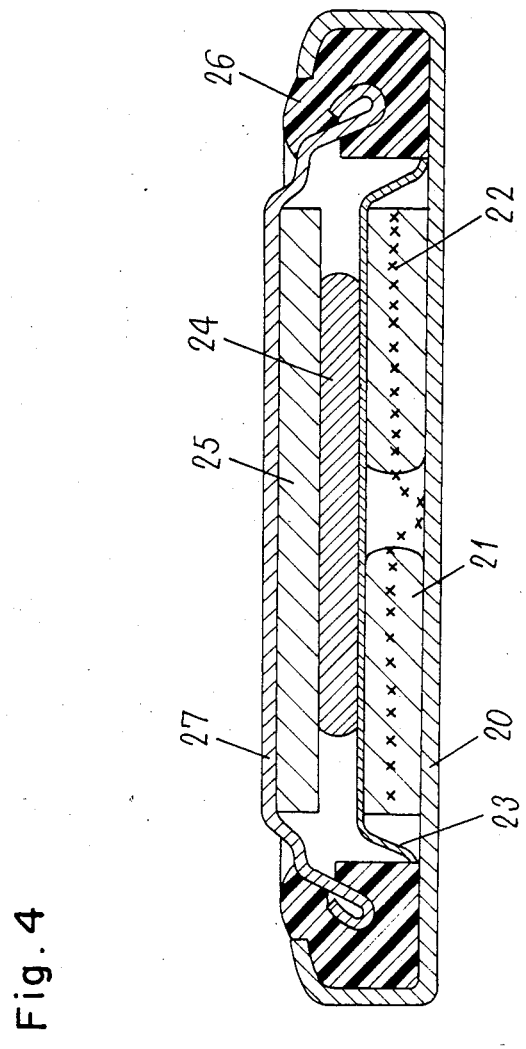
FIG. 4 is a longitudinal sectional view of a secondary battery according to another embodiment of this invention.

FIG. 4 shows a flat type secondary battery according to this invention. Battery case 20 is made of high chrome stainless steel and doubles as a cathode terminal. Cathode 21 is made by molding a cathode mix into a disc with an expanded metal 22 of titanium serving as current collector positioned centrally of said disc. The current collector metal exposed out by removing the mix at the central part is welded to the bottom of the case. Electrolyte is poured into the anode mix thus incorporated in the case, and then separator 23, an assembly of lithium plate 24 and anode alloy 25 is placed above the cathode. Then a sealing plate 27 adapted with a gasket 26 therearound is combined with the assembly, and the top end of case 20 is bent to seal the case.

The batteries of FIGS. 1 and 4 are shown in a state before the alloy is absorbed with lithium.

The present invention will be further described below in relation to the particular embodiments thereof.

EXAMPLE 1

Wood's alloy having a composition of 50% by weight of Bi, 12.5% by weight of Cd, 25% by weight of Pb and 12.5% by weight of Sn was used as anode alloy. This Wood's alloy has a melting point of about 70° C. and belongs to relatively low-melting alloys.

Said Wood's alloy was heated and melted in a crucible and rolled on a polypropylene plate to form a plate of Wood's alloy. Then a current collector was prepared by spot welding a nickel ribbon to an expanded metal of nickel, and this collector and said plate of Wood's alloy were placed one upon another and press bonded by using heated rollers to obtain an approximately 0.2 mm thick electrode plate. This electrode plate was cut to a size of 14 mm×100 mm.

Then a 14 mm×100 mm×0.4 mm thick lithium sheet was press bonded to said electrode plate to form an electrode A.

By way of comparison, a Wood's alloy electrode plate having the same dimensions as said above was shortcircuited with a lithium plate with the same size as said electrode A in a propylene carbonate solution having dissolved therein 1 mol/l of lithium perchlorate, thereby causing lithium absorption in Wood's alloy. The thus made electrode is called B.

Further, an alloy having a composition of 70% by weight of Pb, 25% by weight of Cd and 5% by weight of In was melted and an expanded metal of nickel was partly immersed in said molten alloy, then removed therefrom and solidified to a size of 14 mm×100 mm and a thickness of 0.2 mm. To the exposed side of this expanded metal was press bonded a 14 m×100 m and 0.4 mm thick lithium plate to obtain an electrode such as shown in FIG. 2. Then the expanded metal was bent at its center so that the lithium plate overlay the alloy. The thus made electrode is called C.

As a comparative example, an aluminum plate having a size of 14 mm×100 mm and a thickness of 0.2 mm and a lithium sheet having the same size and a thickness of 0.4 mm were placed one upon another with a nickel net sandwiched therebetween, and the three was press bonded integrally to form an electrode, which is called D.

Cathode was prepared by mixing 10 g of acetylene black and 10 g of a binding agent in 100 g of $TiS_2$ and molding the mixture into a plate having a size of 16 mm×130 mm and a thickness of 1 mm on both sides of an expanded metal of titanium. The theoretical capacity of this cathode was 414 mAh.

This cathode plate was wrapped with a polypropylene-made nonwoven fabric, and this wrapped cathode plate and the previously prepared electrode were placed one upon another, then wound together spirally and placed in a battery case. Thereafter, propylene carbonate having dissolved therein 1 mol/l of lithium perchlorate was poured into the case as electrolyte and then the case was sealed. The battery using electrode A is called a, and the batteries using electrodes B, C and D are called b, c and d, respectively.

FIG. 1 shows the construction of the battery c.

Figure 3:
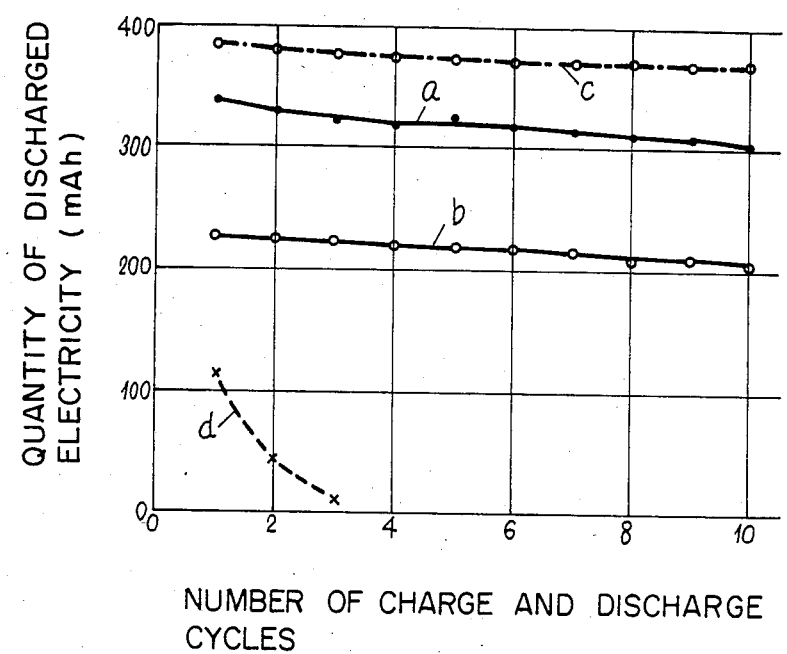
FIG. 3 is a graph showing the change of quantity of discharged electricity in accordance with charge and discharge cycle in the secondary batteries produced according to the various methods.

Each battery was left as it was for one day after sealing for having lithium absorbed in anode alloy in the battery. Thereafter, each battery was subjected to repeated charging and discharging cycles, each cycle comprising discharging down to a battery voltage of 0.8 V and charging to a battery voltage of 2.5 V by applying a current of 50 mA. FIG. 3 illustrates the plots for the quantity of discharged electricity in said cycles of the respective batteries a–d.

Batteries a and c according to this invention showed a large discharging capacity. After the charge and discharge test, batteries were disassembled for examination. Battery a had no crack in Wood's alloy of anode, while battery b suffered crack in the anode at the time of spiral winding in trial manufacture of the battery. The anode remained cracked after charge and discharge, and this proved to be the cause of reduction of charging and discharging capacity.

Comparing a and c, it is seen that a is smaller in discharging capacity than c. This is supposed due to partial separation of anode and lithium at the time of spiral winding because anode and lithium are simply press bonded in a. It is considered that the separated portion of lithium lost electronic conductivity with anode and was not absorbed in the anode alloy, resulting in a smaller amount of lithium absorbed in the anode in a than in c. Battery d was almost incapable of charging and discharging. Disassemblage of the battery showed a black muddy state of aluminum surface, suggesting that produced LiAl was almost unable to collect current.

EXAMPLE 2

An alloy having a composition of 70% by weight of Sn, 25% by weight of Cd and 5% by weight of In was used as anode alloy. This alloy was rolled and die-cut into a disc having 20 mm in diameter and 0.2 mm in thickness. A lithium sheet having a diameter of 18 mm and a thickness of 0.4 mm was press bonded to one side of said disc, and this anode alloy side was press bonded to a sealing plate, thus forming an electrode E.

For comparison, an electrode similar to E was left immersed for a day in propylene carbonate having dissolved therein 1 mol/l of lithium perchlorate to have lithium absorbed in the alloy. The thus treated electrode is referred to as F. Another electrode, called G, was also made by press bonding a lithium sheet to an aluminum plate having the same size as said alloy.

Cathode was made by the same material as used in Example 1 into a disc having 20 mm in diameter and 0.4 mm in thickness. The mix in a 3 mm-diameter circular area at the center of the disc was removed and the exposed collector metal was welded to the battery case.

Electrolyte was poured into the cathode set in the battery case and then separators were properly positioned in the case. Further, an anode-bonded sealing plate and gaskets were assembled into the case and seal the case.

Figure 5:
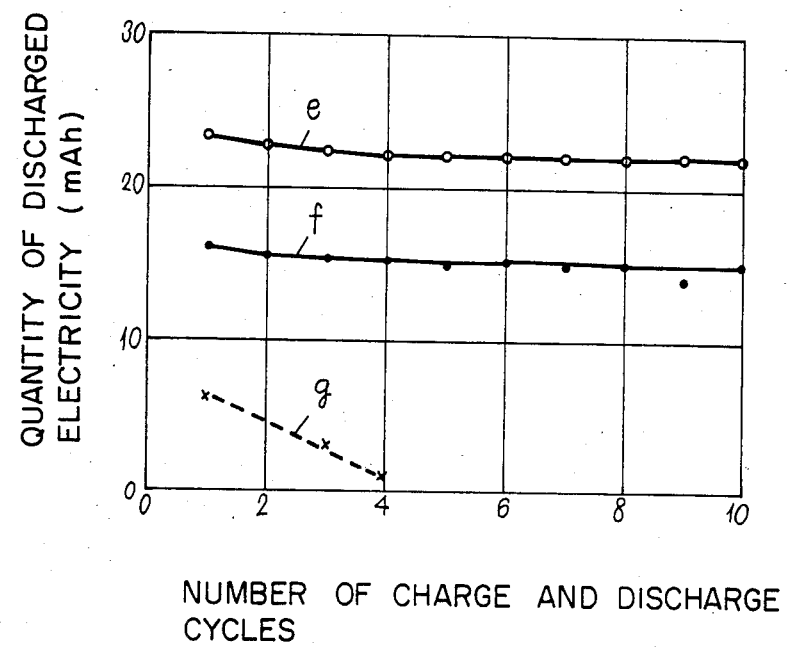
FIG. 5 is a graph showing the change of quantity of discharged electricity in accordance with charge and discharge cycle in secondary batteries.

The batteries using said electrodes E, F and G are called e, f and g, respectively. Each of these batteries was left as it was for one day after sealing and then subjected to the repeated charging and discharging cycles each omprising discharging till reaching a cell voltage of 0.8 V and charging to a battery voltage of 2.5 V by applying a current of 2 mA. FIG. 5 illustrates the plots for quantity of discharged electricity in the respective batteries in said cycles.

Battery f is smaller in quantity of discharged electricity than battery e. This is for the reason that since lithium was absorbed in the anode alloy of electrode F before sealing of the battery, the anode alloy lost its flexibility, became frail and was cracked by the shock of pressure at the time of sealing. In battery g, aluminum was finely powdered for the same reason as stated in Example 1.

While the present invention has been described only by way of its embodiments concerning a specific electrochemical device incorporating alloy anodes, cathode and electrolyte, the scope of this invention is of course not limited to these embodiments.

INDUSTRIAL APPLICABILITY

The present invention realizes rechargeable electrochemical devices such as secondary batteries using lithium as anode active material and characterized by high voltage and high energy density. These electrochemical devices can be utilized as a power sources for various types of electronic equipments, especially those of which the reduction in size and weight is desired.

What is claimed is:

1. A process for producing a rechargeable electrochemical device comprising a reversible cathode, a non-aqueous electrolyte containing lithium ions and an anode made of an lithium-free alloy which absorbs therein lithium ions from the electrolyte on charging to form an alloy with lithium and desorbs lithium as ions into the electrolyte on discharging, said alloy being one which would not be finely powdered even if lithium is absorbed therein to an extent that the potential of said alloy becomes equal to that of lithium metal, wherein said process comprises connecting said alloy to lithium metal so that they are electrically conductive to each other, incorporating said alloy connected to lithium metal into the electrochemical device, and then contacting said alloy connected to lithium metal with the liquid electrolyte in said device to form an alloy absorbing lithium in said alloy.

2. The process of claim 1, comprising the steps of spirally winding said lithium-free alloy and lithium metal along with separator and cathode, incorporating a bunch of the spirally wound electrode plates to the device, and pouring the electrolyte into the device.

3. The process of claim 1, further comprising placing a cathode in said electrochemical device and pouring the electrolyte thereinto, setting lithium-free alloy and lithium metal in said electrochemical device and disposing a separator between them and said cathode.

4. The process of claim 1, wherein said lithium-free alloy anode and lithium metal are plate-shaped.

5. The process of claim 4, wherein the means for connecting said lithium-free alloy and lithium metal so as to be electronically conductive to each other comprises press bonding them.

6. The process of claim 4, wherein the means for connecting said lithium-free alloy and lithium metal so as to be electronically conductive to each other comprises electrically connecting said alloy to a metallic current collector to which lithium has been press bonded.

7. The process of claim 4, wherein the means for connecting said lithium-free alloy and lithium metal so as to be electronically conductive to each other comprises supporting them by a common metallic current collector.

8. The process of claim 1, wherein said lithium-free alloy anode is porous and lithium metal is filled in the pores of the alloy and thereby connected to said alloy so that they are electronically conductive to each other.

9. The process of claim 1, wherein said lithium-free alloy and lithium metal are powder and they are compression molded with a binding agent and connected so as to be electronically conductive to each other.

10. The process of claim 1, wherein said lithium-free alloy is one containing Cd and at least one member selected from the group consisting of Sn, Pb, In and Bi.

11. The process of claim 10, wherein Cd content of said lithium-free alloy is 10 to 80% by weight.

12. The process of claim 11, wherein Cd content of said lithium-free alloy is 10 to 40% by weight.

13. The process of claim 10, wherein said lithium-free alloy contains at least one of Hg, Ca, Sb and Ag in an amount not greater than 20% by weight.

14. The process of claim 1, wherein said lithium-free alloy is one containing Zn and at least one member selected from the group consisting of Sn, Pb, In and Bi.

15. The process of claim 14, wherein Zn content of said lithium-free alloy is 15 to 80% by weight.

16. The process of claim 1, wherein said lithium-free alloy contains at least one metal selected from the group consisting of Zn and Cd, and at least one member selected from the group consisting of Sn, Pb, In and Bi.

17. The process of claim 16, wherein the sum of Zn and Cd contents of said lithium-free alloy is 15 to 80% by weight.

18. A process for producing a rechargeable electrochemical device comprising a reversible cathode, a non-aqueous electrolyte containing lithium ions and an anode made of an lithium-free alloy which absorbs therein lithium ions from the electrolyte on charging to form an alloy with lithium and desorbs lithium as ions into the electrolyte on discharging, said alloy being one which would not be finely powdered even if lithium is absorbed therein to an extent that the potential of said alloy becomes equal to that of lithium metal, which process comprises connecting said alloy to lithium metal so that they are electrically conductive to each other to form an anode assembly, spirally winding said anode assembly together with a separator and cathode, and incorporating said spirally wound anode, separator and cathode into the electrochemical device and then pouring a liquid electrolyte into said device.

19. The process of claim 18, wherein said lithium-free alloy and lithium metal are plate-shaped and supported by a common metallic current collector.

20. The process of claim 18, wherein said lithium-free alloy is one containing Cd and at least one member selected from the group consisting of Sn, Pb, In and Bi, the content of Cd being 10 to 80% by weight.

21. The process of claim 19, wherein said lithium-free alloy is one containing Zn, or Zn and Cd, and at least one member selected from the group consisting of Sn, Pb, In and Bi, and the content of Zn or Zn and Cd is 15 to 80% by weight.

22. A process for producing a rechargeable electrochemical device comprising a reversible cathode, a non-aqueous electrolyte containing lithium ions, an anode made of an lithium-free alloy which absorbs therein lithium ions from the electrolyte on charging and desorbs lithium as ions into the electrolyte on discharging, said alloy being one which should not be finely powdered even if lithium is absorbed therein to an extent that the potential of said alloy becomes equal to that of lithium metal, which process comprises forming an anode assembly by connecting said alloy to lithium metal so that they are electrically conductive to each other, placing said cathode and electrolyte in said electrochemical device and then placing said anode assembly into said electrochemical device.

23. The process of claim 22, wherein said lithium-free alloy is one containing Cd and at least one member selected from the group consisting of Sn, Pb, In and Bi, the content of Cd being 10 to 80% by weight.

24. The process of claim 22, wherein said lithium-free alloy is one containing Zn, or Zn and Cd, and at least one member selected from the group consisting of Sn, Pb, In and Bi, and the content of Zn or Zn and Cd is 15 to 80% by weight.

* * * * *